June 4, 1929.  H. RAIMANN  1,716,241
MACHINE FOR SWAGING SAW TEETH
Filed May 24, 1926   5 Sheets-Sheet 1
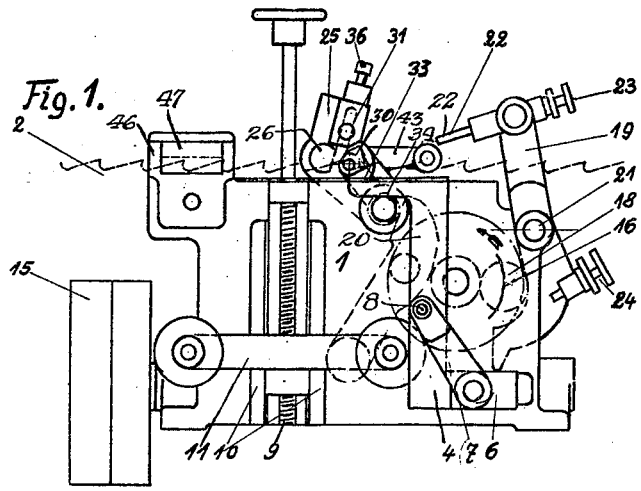
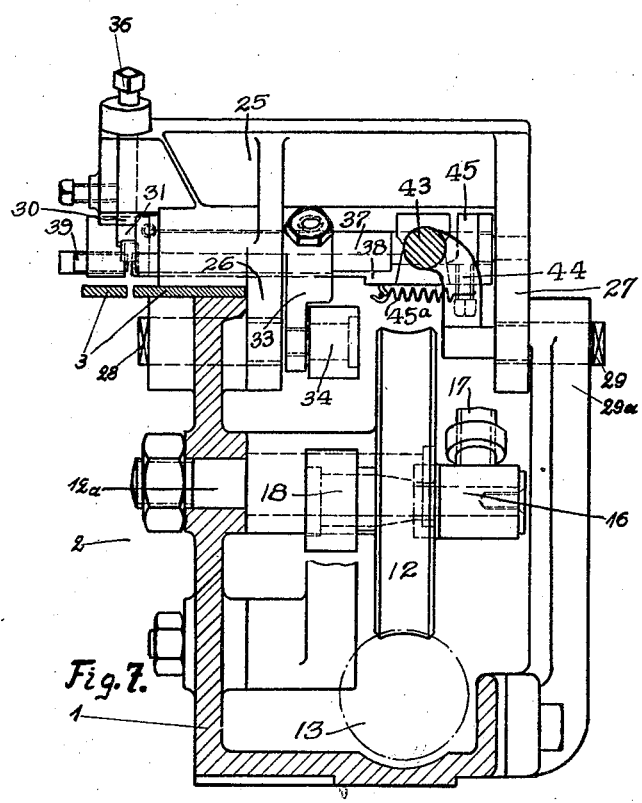
Inventor:
HUGO RAIMANN.
Attorney:

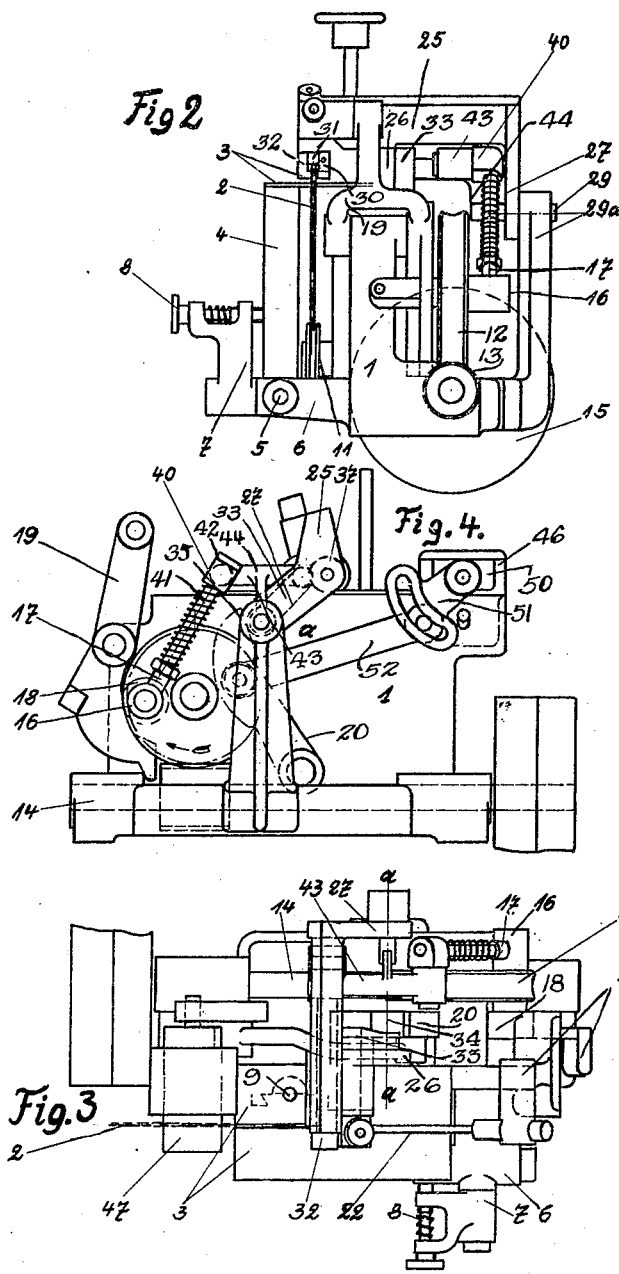

June 4, 1929.　　　　H. RAIMANN　　　　1,716,241
MACHINE FOR SWAGING SAW TEETH
Filed May 24, 1926　　　5 Sheets-Sheet 3

Inventor.
HUGO RAIMANN.

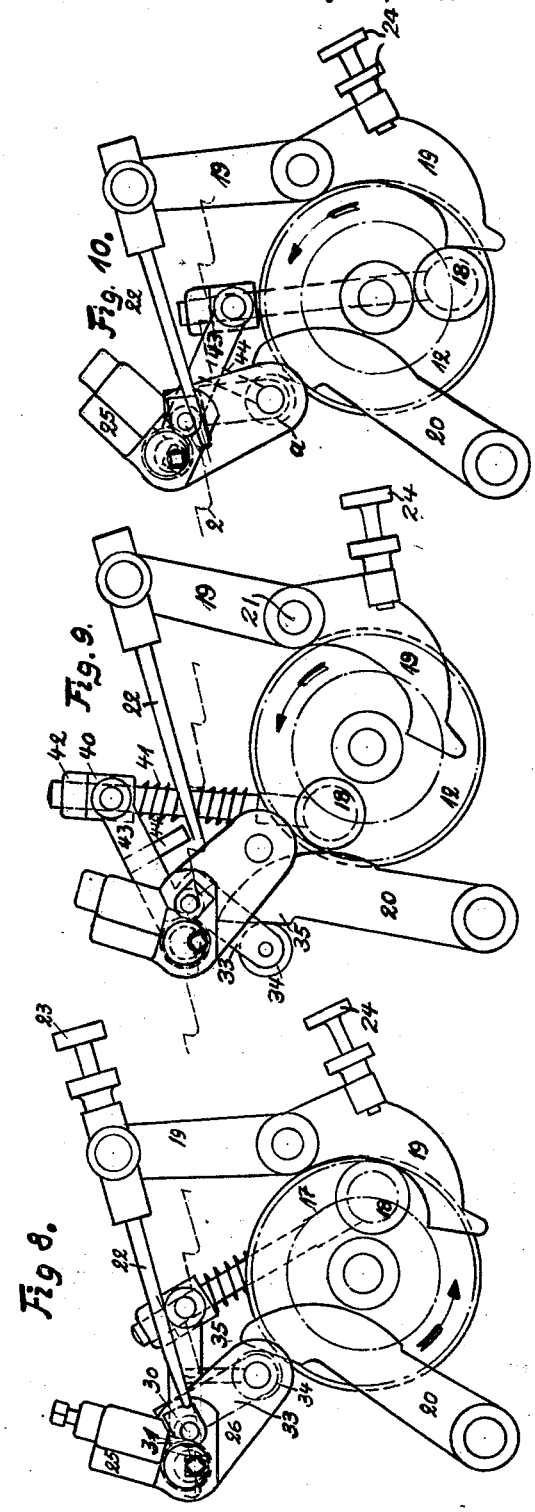

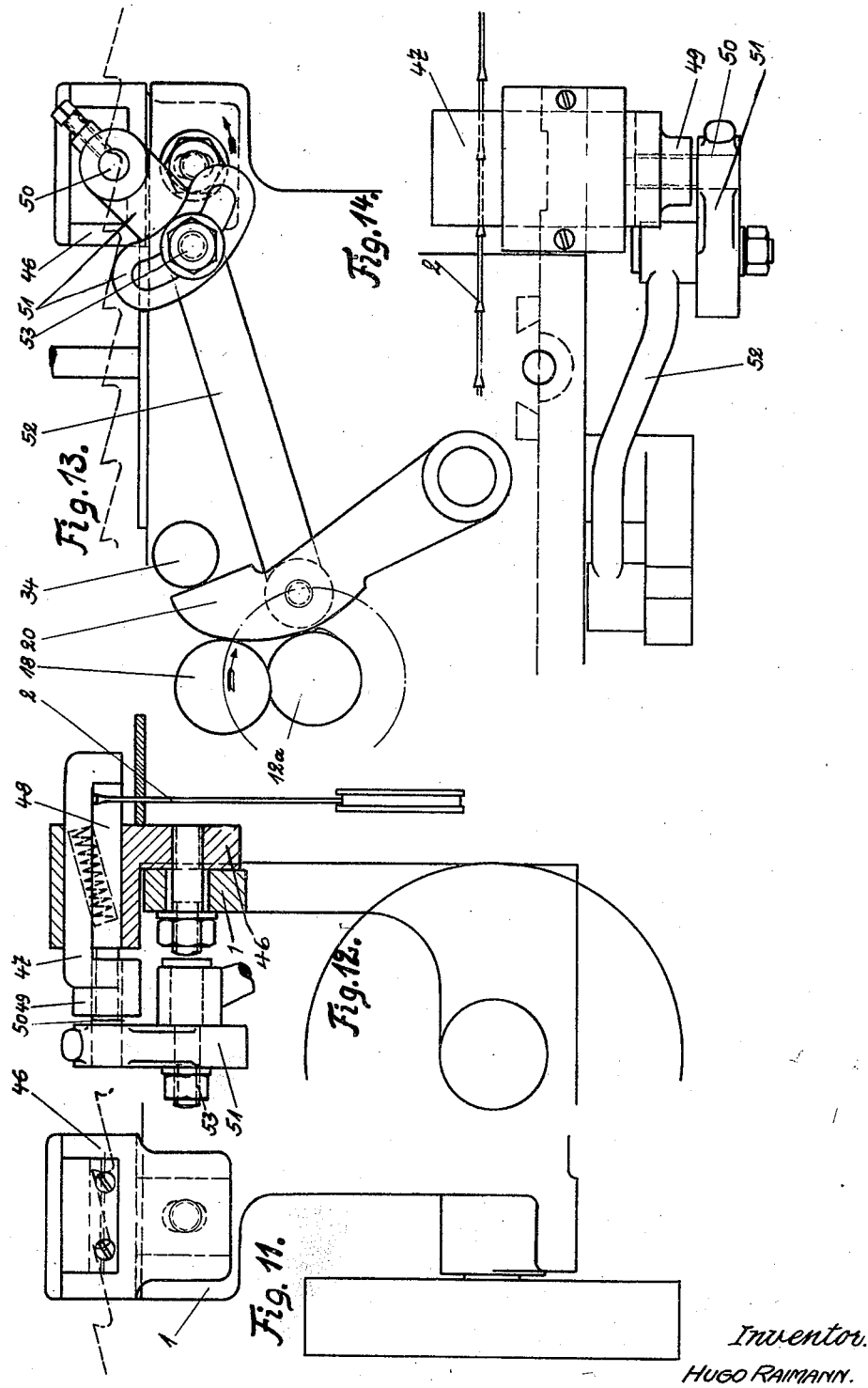

Patented June 4, 1929.

1,716,241

UNITED STATES PATENT OFFICE.

HUGO RAIMANN, OF BADEN, GERMANY, ASSIGNOR TO B. RAIMANN G. M. B. H., OF BADEN, GERMANY, A COMPANY OF GERMANY.

MACHINE FOR SWAGING SAW TEETH.

Application filed May 24, 1926, Serial No. 111,393, and in Germany May 28, 1925.

It is usual, in machines for swaging and shaping saw teeth, to move or feed the saw forwards between two rollers, in order to shape a tooth after it has been swaged. This imposes on the mechanism a strain liable to interfere with the accuracy of the feed. The pivot or spindle of the swage is generally rocked aside or caused to travel up an inclined plane after the swaging operation.

According to my invention the swaging and the shaping operations are both performed during the same stage of the passage of the saw through the machine, while the saw is stationary between two feed movements. The swaging appliance has a saw clamp associated therewith, and is rocked to lift it off the saw after the swaging operation.

Figure 5:
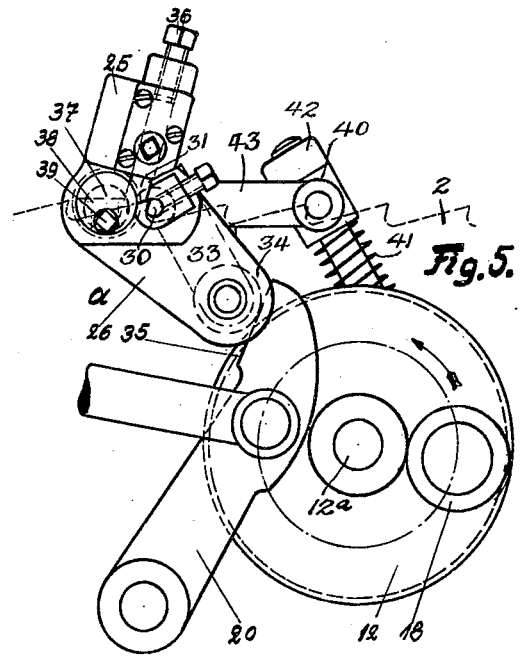
Figure 6:
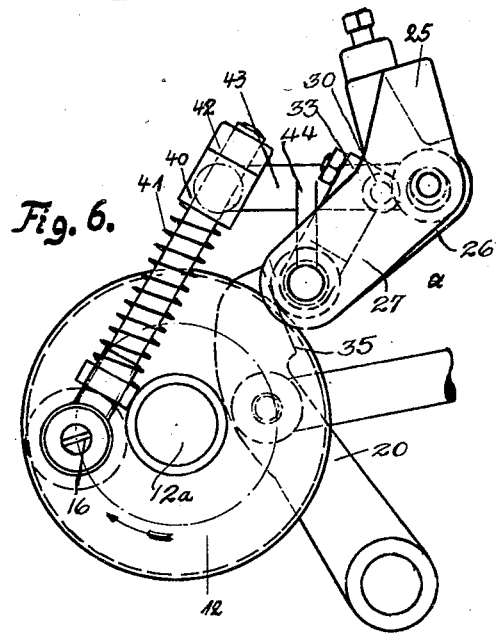

A machine embodying the invention is shown in the accompanying drawing, in which:

Fig. 1 is a front elevation thereof,
Fig. 2 a side view,
Fig. 3 a plan view, and
Fig. 4 a rear view;
Figs. 5 and 6 show part of the actuating mechanism to a larger scale, from front and rear respectively, and
Fig. 7 is a cross-section of the swaging mechanism;
Figs. 8, 9, and 10 show the swaging and feeding appliances in different positions;
Figs. 11 and 12 show the shaping appliance.
Fig. 13 is another rear view of the tooth shaping appliance and,
Fig. 14 is a plan view thereof.

In the drawing 1 represents the frame of the machine, in which the saw 2 is guided at the sides by means of two plates 3, one of which is fixed to an arm 4 rocking on a shaft 5, the latter being journalled in a bracket 6. A holder 7 fixed to the bracket 6 has eyes for guiding a stud 8, which is thrust by a spring against the arm 4, in order firmly to grip the saw. The back of the saw is guided by means of rollers on a holder 11, which is vertically adjustable on guides 10 by means of a screw spindle 9. The mechanism is actuated by means of a pulley 15 on a shaft 14, to which is fixed a worm 13 driving a worm wheel 12. On the worm wheel there is a stud or crank pin 16, upon which is pivoted a rod 17 for lowering and lifting the swaging device and actuating the saw clamp. The stud 16 passes through the wheel 12 and has mounted upon it a roller 18 for actuating a double-armed feed lever 19, which is pivoted at 21 to the frame and carries a pawl 22 and set screws 23, 24. The roller 18 also actuates a lever 20, and the latter actuates the swaging and shaping appliances. The pawl 22, engaging a tooth of the saw, feeds the latter forwards when the lever 19 is rocked in one direction, and while the pawl is being retracted the swaging appliance 25 is applied to the tooth to be shaped. The swaging appliance is rocked by means of two levers 26, 27 pivoted upon studs 28, 29, whose axes are at $a$. These levers carry a spindle 30, with an adjustable swage 31, which is always above the saw. Close to the swage 31 there is a clamp 32, whereby the tooth is firmly held during the shaping operation.

The spindle 30 is rotated by means of a lever arm 33, which is fixed thereto and carries a roller 34. When the swaging appliance is at rest the axis of this roller 34 is in line with the axis of the studs 28 and 29. The roller then rests against a surface 35 on the lever 20.

The clamp 32 comes into operation before the swaging appliance, and consists of a slide 37 having a jaw 39, and a slide 38.

The rod 17 has at its upper end an adjustable collar 42, against which a slidable ring 40 is thrust by a spring 41. Pivoted to the ring 40 is a link 43 rotatably engaging the slide 37 and having above the axis $a$ an arm 44 adapted to rest on the stud 29. The eye of the link engaging the slide 37 has two screw or cam surfaces, one of which is in contact with a correspondingly shaped ring 45 attached to the slide 37, the other being in contact with the slide 38. A spring 45$^a$ pulls the ring 45 and slide 38 against the cam surfaces of the link.

When after an advance of the saw 2 the crank pin 16 rotates in the direction indicated by the arrow in the drawing the link 43, with its arm 44 resting on the stud 29, rotates with the swaging appliance 25 about the axis $a$ till the swage 31 is seated upon the back of the tooth to be shaped. This stops the rotation of the swaging appliance. The spindle 30 abuts against the front edge of the tooth, and the jaws of the slides 37 and 38 lie at opposite sides of the lower part of the tooth. This position of the parts here referred to is shown in Figs. 1 to 8. Continued rotation of the crank pin causes the link 43 to rotate on the slide 37, and its two cam surfaces cause the parts 37 and 38 to grip the tooth. The spring 41 prevents the pressure from being excessive, in case the saw is exceptionally thick.

When the crank pin 16 reaches the top of its travel the roller 18 actuates the lever 20, and the surface 35 of this lever, acting on the roller 34, and lever arm 33, rotates the spindle 30, and the tooth is accordingly swaged in the usual way. The crank pin then clears the lever 20, and the spindle is rotated back to its starting position by suitable means, for example a spring. At the same time the rod 17 pulls the link 43 downwards, till the arm 44 of the link rests on the stud 29, and the clamp 32 is opened. Rotation of the link on the slide 37 then ceases, and the swaging appliance rocks upwards about the axis $a$, to allow the next saw tooth to be moved into position for swaging.

While the lever 20 is rotating the spindle 30, a link 52 which is connected to it and engages a slotted lever 51 moves a tooth setting or shaping die 47 in a holder 46 towards a stationary setting or shaping die 48. The die 47 is moved by a nut 49, which is fixed thereto and engages a screw spindle 50 rotated by the lever 51. The swaged tooth is thus given the required width and shape. For regulating the movement of the die 47 the link 52 is adjusted in the slot of the lever 51 by means of a nut 53. A spring between the dies ensures release of the saw when the link 52 is retracted.

What I claim as my invention and desire to secure by Letters Patent of the United States is:—

In a machine for swaging saw teeth the combination of a saw guide, a swaging device, a wheel, an actuating member on one side of said wheel, a crank pin on the other side of said wheel, saw feed mechanism including a lever actuatable by said actuating member, swage actuating mechanism including a lever actuatable by said actuating member, means including a rod connected to said crank pin for moving said swage to and from said saw guide, and a saw clamp including two slidable jaws and a link pivoted to one of said jaws and to said rod, said link having cam surfaces for actuating said jaws.

In witness whereof I have signed this specification.

HUGO RAIMANN.